United States Patent [19]

Shigemoto

[11] Patent Number: 5,025,057

[45] Date of Patent: Jun. 18, 1991

[54] 4-METHYL-1-PENTENE POLYMER COMPOSITIONS

[75] Inventor: Hiromi Shigemoto, Iwakuni, Japan

[73] Assignee: Mitsui Petrochemical Industries, Ltd., Tokyo, Japan

[21] Appl. No.: 283,974

[22] Filed: Dec. 13, 1988

[30] Foreign Application Priority Data

Dec. 22, 1987 [JP] Japan .............................. 62-324386
Dec. 22, 1987 [JP] Japan .............................. 62-324387

[51] Int. Cl.$^5$ ...................... C08L 23/20; C08L 23/10; C08L 23/24

[52] U.S. Cl. .................................. 524/423; 524/424; 524/425; 524/444; 524/445; 524/447; 524/448; 524/451; 524/528; 525/240

[58] Field of Search ............... 524/528, 423, 424, 425, 524/444, 445, 447, 448, 481; 525/240

[56] References Cited

U.S. PATENT DOCUMENTS

| | | | |
|---|---|---|---|
| 4,166,057 | 8/1979 | Takemori | 524/528 |
| 4,471,085 | 9/1984 | Yamomoto | 524/528 |
| 4,634,735 | 1/1987 | Thiersault | 524/528 |
| 4,785,045 | 11/1988 | Yonekura | 524/528 |
| 4,938,910 | 7/1990 | Abe | 525/240 |

FOREIGN PATENT DOCUMENTS 59-140245 8/1984 Japan .

Primary Examiner—C. Warren Ivy
Attorney, Agent, or Firm—Nixon & Vanderhye

[57] ABSTRACT

In accordance with the present invention, there are provided 4-methyl-1-pentene polymer compositions comprising 90–10 parts by weight of 4-methyl-1-pentene polymer (A), 90–10 parts by weight of propylene polymer (B) and 70–10 parts by weight of inorganic filler (C), provided that the sum of (A), (B) and (C) total to 100 parts by weight. There are also provided 4-methyl-1-pentene polymer compositions 20–3 parts by weight of α-olefin copolymer (D) in addition to the above-mentioned components (A), (B) and (C), provided that the sum of (A), (B), (C) and (D) totals to 100 parts by weight.

These compositions as illustrated above are capable of vacuum forming, injection blow-forming and the like, and they are excellent in rigidity at high temperatures, toughness at low temperature and impact strength.

3 Claims, No Drawings

4-METHYL-1-PENTENE POLYMER COMPOSITIONS

FIELD OF THE INVENTION

This invention relates to 4-methyl-1-pentene polymer compositions and more particularly to 4-methyl-1-pentene polymer compositions excellent in rigidity at high temperatures, toughness at low temperatures, thermoformability such as vacuum formability, surface hardness and the like properties.

BACKGROUND OF THE INVENTION

It is well known that when polyolefin such as polyethylene or polypropylene is incorporated with inorganic fillers such as calcium carbonate, barium sulfate and talc, the thus incorporated polyolefin is improved in rigidity. On one hand, 4-methyl-1-pentene polymer which is a kind of polyolefin is excellent in heat resistance, chemical resistance, transparency, mold release characteristics, etc., as compared with other polyolefins, but from the viewpoint of molecular structure there was such a problem that because of its low melt tension, the polymer is difficult to thermoform. Further, there was another problem that the incorporation into 4-methyl-1-pentene polymer of such inorganic fillers as mentioned above results in improved rigidity at high temperatures, but the toughness at low temperatures of the polymer thus incorporated comes to decrease thereby.

OBJECT OF THE INVENTION

The present invention is intended to solve such problems associated with the prior art as mentioned above, and it is an object of the invention to provide 4-methyl-1-pentene polymer compositions having excellent thermoformability through which the polymer can readily be thermoformed, for example, by means of vacuum forming, injection blow molding and the like techniques, and excellent in rigidity at high temperature, toughness at low temperature and impact strength.

SUMMARY OF THE INVENTION

A first 4-methyl-1-pentene polymer composition of the present invention comprises 90-10 parts by weight of 4-methyl-1-pentene polymer (A), 90-10 parts by weight of propylene polymer (B) and 70-30 parts by weight of inorganic filler (C).

A second 4-methyl-1-pentene polymer composition of the present invention comprises 90-10 parts by weight of 4-methyl-1-pentene polymer (A), 90-10 parts by weight of propylene polymer (B), 70-10 parts by weight of inorganic filler (C) and 20-3 parts by weight of α-olefin copolymer (D) which is a random copolymer of at least 2 kinds of α-olefins, said random copolymer having a melt index of 0.1-50 g/10 min., a density of 0.850-0.900 g/cm$^3$, a melting point of 40°-130° C. and a crystallinity index as measured by X-ray of less than 40%.

Because of their components as defined above, the 4-methyl-1-pentene polymer compositions are excellent in thermoformability, rigidity at high temperatures, toughness at low temperatures, impact strength and the like properties.

DETAILED DESCRIPTION OF THE INVENTION

The components of the 4-methyl-1-pentene polymer compositions of the present invention are illustrated below in detail.

The 4-methyl-1-pentene polymer (A) used in the present invention is usually crystalline resin and includes a homopolymer of 4-methyl-1-pentene or copolymers of methyl-1-pentene and other α-olefins of 2-20 carbon atoms, for example, ethylene, propylene, 1-butene, 1-hexene, 1-octene, 1-decene, 1-tetradecene, 1-octadecene, etc., said copolymers usually being polymers consisting essentially of 4-methyl-1-pentene in an amount of at least 85 mol %. Usually, this 4-methyl-1-pentene polymer (A) has a melt flow rate (MFR) measured by ASTM D1238 (temperature: 260° C., load: 5 kg) of 0.05-500 g/10 min, though this rate may be varied according to the purpose for which the composition containing this polymer is used.

The propylene polymer (B) used in the present invention is usually a crystalline resin and includes a homopolymer of propylene or copolymers of propylene and less than 30% by weight of at least one other α-olefin having 2-20 carbon atoms, for example, ethylene, 1-butene, 1-hexene, 4-methyl-1-pentene, etc. or terpolymers of propylene, ethylene and less than 5% by weight of a polyene component, for example, 5-ethylidene-2-norbornene, 5-methylene-2-norbornene or 1,4-hexadiene. Usually, this propylene polymer (B) has a melting point of at least 130° C. and a MFR of 0.1-80 g/10 min (ASTM D1238 L).

The inorganic filler (C) used in the present invention includes inorganic substances such as calcium carbonate, magnesium carbonate, hydrous basic magnesium carbonate, kaolin clay, pyrophyllite, talc, calcined clay, diatomaceous earth, barium sulfate, etc. Of these inorganic substances, particularly preferred is talc.

The α-olefin copolymer (D) used in the present invention is a random copolymer of at least two kinds of α-olefins. This α-olefin copolymer has a crystallinity index as measured by X-ray of less than 40%, preferably 1-30%, and is amorphous or low crystalline. This α-olefin copolymer (D) has a melt index of 0.1-50 g/10 min, preferably 2-8 g/10 min (ASTM D1238 E), a density of 0.850-0.900 g/cm$^3$, preferably 0.875-0.895 g/cm$^3$ and a melting point of 40°-130° C., preferably 60°-80° C.

Concretely speaking, this α-olefin copolymer (D) is composed of at least two kinds of α-olefins selected from α-olefins of 2-20 carbon atoms such as ethylene, propylene, 1-butene, 4-methyl-1-pentene, 1-hexene, 1-octene, 1-decene, 1-dodecene, 1-tetradecene, 1-hexadecene, 1-octadecene, and 1-eicosene. Random copolymers of such α-olefins as mentioned above include concretely ethylene/propylene copolymers, ethylene/1-butene copolymers, ethylene/1-hexene copolymers, ethylene/1-octene copolymers, ethylene/1-decene copolymers, ethylene/1-hexadecene copolymers, propylene/1-butene copolymers, propylene/1-hexene copolymers, propylene/1-octene copolymers, propylene/1-decene copolymers, 1-butene/4-methyl-1-pentene copolymers, 1-butene/1-octene copolymers, 1-hexene/1-octene copolymers, ethylene/propylene/1-butene copolymers, ethylene/propylene/1-hexene copolymers, ethylene/1-butene/1-hexene copolymers, etc.

In the first 4-methyl-1-pentene polymer composition of the present invention as illustrated above, there are present the 4-methyl-1-pentene polymer (A) in an amount of 90–10, preferably 70–30 parts by weight, the propylene polymer (B) in an amount of 90–10, preferably 70–30 parts by weight and the inorganic filler (C) in an amount of 70–30, preferably 50–30 parts by weight, provided that the sum of (A), (B) and (C) totals to 100 parts by weight.

In preparing the first 4-methyl-1-pentene polymer composition of the present invention, the use of the 4-methyl-1-pentene polymer (A) in an amount of 90–10 parts by weight is desirable, because the resulting composition becomes good in heat-resistant rigidity and impact strength. Similarly, the use of the propylene polymer (B) in an amount of 90–10 parts by weight is desirable, because the resulting composition becomes tough and, is excellent in heat-resistant rigidity. The use of the inorganic filler (C) in an amount of 70–30 parts by weight is similarly desirable, because the resulting composition becomes excellent in heat-resistance rigidity and, toughness.

In the second 4-methyl-1-pentene polymer compositions of the present invention, there are present the 4-methyl-1-pentene polymer (A) in an amount of 90–10, preferably 70–30 parts by weight, the propylene polymer (B) in an amount of 90–10, preferably 70–30 parts by weight, the inorganic filler (C) in an amount of 70–10, preferably 50–30 parts by weight, and the α-olefin copolymer (D) in an amount of 20–3, preferably 15–5 parts by weight, provided that the sum of (A), (B), (C) and (D) totals to 100 parts by weight.

In preparing the second 4-methyl-1-pentene polymer composition of the present invention, the use of the α-olefin copolymer (D) in an amount of 20–3 parts by weight is desirable, because the resulting composition is improved in impact strength and maintains a good heat-resistant rigidity.

The 4-methyl-1-pentene polymer compositions of the present invention as illustrated above may be prepared by mixing, melt kneading, granulating or pulverizing a mixture comprising the 4-methyl-1-pentene polymer (A), propylene polymer (B), inorganic filler (C) and/or α-olefin copolymer (D) in the specific proportion as defined above by various known methods, for example, those using a V-blender, ribbon blender, Henschel mixer, tumbler blender, extruder, single-screw extruder, double-screw extruder, kneader, Banbury mixer or the like.

The 4-methyl-1-pentene polymer compositions of the present invention may be incorporated with various additives comonly added to polyolefin such as weathering agents, heat stabilizers, rust preventives, slip agents, nucleating agents, pigments, dyes, surfactants, etc. in such an amount as will not hinder the object of the present invention.

Because of their excellent rigidity at high temperatures, toughness at low temperatures, thermoformability such as vacuum formability, surface hardness and the like, the 4-methyl-1-pentene polymer compositions of the present invention are suitable for use in parts of household electrical apppliances, tablewares for electron range cooking, industrial parts, etc.

The present invention is illustrated below in detail with reference to examples, but it should be construed that the invention is in no way limited to those examples but may be varied and modified within the spirit and scope of the invention.

EXAMPLE 1

Using a Henschel mixer, a mixture was prepared by mixing together 35 parts by weight of 4-methyl-1-pentene/1-decene crystalline copolymer (1-decene content: 3% by weight, melting point: 236° C., MFR: 26 g/10 min), 35 parts by weight of propylene/ethylene crystalline block copolymer (ethylene content: 20% by weight, density: 0.91 g/cc, MFR: 0.5 g/10 min), 30 parts by weight of talc (a product of Matsumura Sangyo, sold under a trade name Crown P-2), 0.25 part by weight of tetrakis [methylene-3-(3,5-di-tert-butyl-4-hydroxyphenyl)propionate] methane (a product of Musashino-Geigy, sold under a trade name Iruganox 1010: hereinafter abbreviated to TPM), and 0.25 part by weight of stearic acid monoglyceride (a product of Kao Soap, sold under a trade name Atomos #150; hereinafter abbreviated to SMG). The resulting mixture was melt kneaded with a 40 mmφ extruder to obtain composition-I.

With an injection molding machine (M-100 Type manufactured and sold by Meiki Seisakusho) operated at the molding temperature of 300° C. and the mold temperature of 60° C., the composition-I thus obtained was then molded into a test specimen, 120 mm×20 mm×3 mm, for measuring heat deformation temperature (HDT), an ASTM TYPE IV specimen for tensile test, a test specimen for Izod impact test, and into a square sheet, 100 mm×100 mm×2 mm, for surface hardness test, respectively. These test specimens thus prepared were evaluated by the following procedures.

Tensile test: Measurement was conducted in accordance with ASTM D638, provided that the ASTM TYPE IV specimen was used.

Heat deformation temperature: Measurement was conducted in accordance with ASTM D648, provided that the load applied was 66 psi.

Izod impact test: Measurement was conducted in accordance with ASTM D256.

Surface hardness: Measurement was conducted in accordance with JIS K-5401.

Separately, the composition-I was molded at a press temperature of 260° C. and a press pressure of 80 kg/cm² into a film of 300 μm in thickness.

The film thus obtained was co-biaxially oriented at 260° C., whereupon a biaxially oriented film of a draw ratio of 3×3 was obtained.

The results obtained are shown in Table 1.

EXAMPLES 2–4

Example 1 was repeated except that the amounts of the components used therein were changed to those as shown in Table 1.

The results obtained are shown in Table 1.

COMPARATIVE EXAMPLES 1–4

Example 1 was prepared except that the amounts of the components used therein were changed to those as shown in Table 1.

The results obtained are shown in Table 1.

TABLE 1

|  | Example 1 | Example 2 | Example 3 | Example 4 | Comparative Example 1 | Comparative Example 2 | Comparative Example 3 | Comparative Example 4 |
| --- | --- | --- | --- | --- | --- | --- | --- | --- |
| 4-methyl-1-pentene/1-decene | 35 | 55 | 25 | 20 | 50 | 10 | 90 | 5 |

TABLE 1-continued

|  | Example 1 | Example 2 | Example 3 | Example 4 | Comparative Example 1 | Comparative Example 2 | Comparative Example 3 | Comparative Example 4 |
| --- | --- | --- | --- | --- | --- | --- | --- | --- |
| crystalline copolymer Propylene/ethylene crystalline block copolymer | 35 | 25 | 25 | 50 | 50 | 10 | 5 | 90 |
| Talc | 30 | 20 | 50 | 30 | — | 80 | 5 | 5 |
| Stress at yield (kg/cm$^2$) | 285 | 280 | 290 | 280 | 230 | 320 | 233 | 237 |
| Elongation at yield (%) | 8 | 10 | 7 | 10 | 15 | Less than 1 | 10 | 20 |
| Heat deformation temperature (°C.) | 136 | 135 | 145 | 130 | 85 | 180 | 95 | 92 |
| Izod impact strength without notch (kg · cm/cm$^2$) | 15 | 20 | 10 | 25 | 20 | Less than 1 | 8 | 16 |
| Surface hardness (Pencil hardness) | H | H | H | H | 3B | 2H | B | B |
| Result of biaxial orientation |  |  |  |  |  |  |  |  |
| Minimum orientation temperature (°C.) | 240 | 240 | 240 | 235 | 230 | — | 235 | 195 |
| Draw ratio | 3 × 3 | 3 × 3 | 3 × 3 | 3 × 3 | 4 × 4 | — | 3 × 3 | 4 × 4 |
| Evaluation | ◎ | ◎ | ◎ | ◎ | ◎ | X (not stretchable) | Δ (Irregular stretching) | ◎ |

EXAMPLE 5

Using a Henschel mixer, a mixture was prepared by mixing together 35 parts by weight of 4-methyl-1-pentene/1-decene crystalline copolymer (1-decene content: 3% by weight, melting point: 236° C., MFR: 26 g/10 min), 30 parts by weight of propylene/ethylene crystalline block copolymer (ethylene content: 20% by weight, density: 0.91 g/cc, MFR: 0.5 g/10 min), 30 parts by weight of talc (Crown P-2), 5 parts by weight of ethylene/1-butene random copolymer (ethylene content 80% by weight MFR (ASTM D 1238 E, 4 g/10 min), density 0.886 g/cm$^3$), 0.25 part by weight of tetrakis [methylene-3-(3,5-di-tert-butyl-4-hydroxyphenyl)-propionate] methane (TPM) and 0.25 part by weight of stearic acid monoglyceride (Atomos #150). The resulting mixture was melt kneaded with a 40 mmφ extruder to obtain composition-II.

With an injection molding machine (M-100 Type of Meiki Seisakusho) operated at the molding temperature of 300° C. and the mold temperature of 60° C., the composition-II thus obtained was then molded into a test specimen, 120 mm × 20 mm × 3 mm, measuring heat deformation temperature (HDT), an ASTM TYPE IV specimen for tensile test, a test specimen for Izod impact test, and into a square sheet, 100 mm × 100 mm × 2 mm, for surface hardness test, respectively. These test specimens thus prepared were evaluated by the same procedures as in Example 1.

Separately, the composition-II was molded at a press temperature of 260° C. and a press pressure of 80 kg/cm$^2$ into a film of 400 μm in thickness.

The film thus obtained was co-biaxially oriented at 235° C., whereupon a biaxially oriented film of a draw ratio of 3×3 was obtained.

The results obtained are shown in Table 2.

EXAMPLES 6-8

Example 5 was repeated except that the amount of the components used therein were changed to those as shown in Table 2.

The results obtained are shown in Table 2.

COMPARATIVE EXAMPLES 5-7

Example 5 was repeated except that the amounts of the components used therein were changed to those as shown in Table 2.

The results obtained are shown in Table 2.

For reference's sake, the results obtained in Comparative Example 1 are shown also in Table 2.

TABLE 2

|  | Example 5 | Example 6 | Example 7 | Example 8 | Comparative Example 1 | Comparative Example 5 | Comparative Example 6 | Comparative Example 7 |
| --- | --- | --- | --- | --- | --- | --- | --- | --- |
| 4-methyl-1-pentene/1-decene crystalline copolymer | 35 | 45 | 25 | 20 | 50 | 10 | 85 | 5 |
| Propylene/ethylene crystalline block copolymer | 30 | 25 | 25 | 20 | 50 | 5 | 5 | 85 |
| Talc | 30 | 20 | 45 | 50 | — | 80 | 5 | 5 |
| Ethylene/1-butene random copolymer | 5 | 10 | 5 | 10 | — | 5 | 5 | 5 |
| Stress at yield (kg/cm$^2$) | 280 | 275 | 285 | 290 | 230 | 315 | 230 | 235 |
| Elongation at yield (%) | 10 | 15 | 8 | 10 | 15 | 1 | 12 | 25 |
| Heat deformation temperature (°C.) | 135 | 130 | 140 | 145 | 85 | 175 | 95 | 90 |
| Izod impact strength without notch (kg · cm/cm$^2$) | 20 | 35 | 15 | 30 | 20 | 1 | 10 | 18 |
| Surface hardness (Pencil hardness) | H | H | H | H | 3B | 2H | B | B |
| Result of biaxial orientation |  |  |  |  |  |  |  |  |
| Minimum orientation temperature (°C.) | 235 | 235 | 235 | 240 | 230 | — | 235 | 190 |
| Draw ratio | 3 × 3 | 3 × 3 | 3 × 3 | 3 × 3 | 4 × 4 | — | — | 4 × 4 |

TABLE 2-continued

| | Example 5 | Example 6 | Example 7 | Example 8 | Comparative Example 1 | Comparative Example 5 | Comparative Example 6 | Comparative Example 7 |
|---|---|---|---|---|---|---|---|---|
| Evaluation | ⊚ | ⊚ | ⊚ | ⊚ | ⊚ | X (not stretchable) | Δ - X (Irregular stretching) | ⊚ |

What is claimed is:

1. A 4-methyl-1-pentene polymer composition consisting essentially of:
   (A) 90-10 parts by weight of 4-methyl-1-pentene polymer, which is crystalline homopolymer of 4-methyl-1-pentene or a α-olefin of 2-20 carbon atoms and which has at least 85 mol % 4-methyl-1-pentene and which has at least 85 mol % 4-methyl-1-pentene units;
   (B) 90-10 parts by weight of propylene polymer which is crystalline homopolymer of propylene or a crystalline copolymer of propylene or a crystalline copolymer of propylene and less than 30% by weight of at least one other α-olefin having 2-20 carbon atoms, said propylene polymer having a melting point of at least 130° C. and a MFR of 0.1-80 g/10 min.;
   (C) 70-10 parts by weight of an inorganic filler; and
   (D) 20-3 parts by weight of α-olefin copolymer which is random copolymer of at least two different α-olefins, said random copolymer having a MFR of 0.1-50 g/10 min., a density of 0.850-0.900 g/cm$^3$, a melting point of 40°-80° C. and a crystallinity index as measured by X-ray of less than 40%, said copolymer selected from the group consisting of ethylene/propylene copolymers, ethylene/1-butene copolymers, ethylene/1-hexene copolymers, ethylene/1-octane copolymers, ethylene/1-decene copolymers, ethylene/1-hexadecene copolymers, propylene/1-butene copolymers, propylene/1-hexene copolymers, propylene/1-octene copolymers, propylene/1-decene copolymers, 1-butene/1-octene copolymers, 1-hexene/1-octene copolymers, ethylene/propylene/1-hexene copolymers and ethylene/1-butene/1-hexene copolymers.

2. The composition as claimed in claim 1, wherein the inorganic filler is calcium carbonate, magnesium carbonate, hydrous basic magnesium carbonate, kaolin, pyrophyllite, talc, calcined clay, diatomaceous earth or barium sulfate.

3. The composition as claimed in claim 1, wherein said composition contains 70-30 parts by weight of the 4-methyl-1-pentene polymer (A), 70-30 parts by weight of the propylene polymer (B), 50-30 parts by weight of inorganic filler (C), and 15-5 parts by weight of α-olefin copolymer (D).

* * * * *

UNITED STATES PATENT AND TRADEMARK OFFICE
CERTIFICATE OF CORRECTION

PATENT NO. : 5,025,057

DATED : June 18, 1991

INVENTOR(S) : SHIGEMORI et al

Page 1 of 2

It is certified that error appears in the above-indentified patent and that said Letters Patent is hereby corrected as shown below:

Column 7, lines 10-33, claim 1, should read as follows:
1. A 4-methyl-1-pentene polymer composition consisting essentially of:
(A) 90-10 parts by weight of 4-methyl-1-pentene polymer, which is crystalline homopolymer of 4-methyl-1-pentene or crystalline copolymer of 4-methyl-1-pentene and another alpha-olefin of 2-20 carbon atoms which has at least 85 mol % 4-methyl-1-pentene units;
(B) 90-10 parts by weight of propylene polymer which is crystalline homopolymer of propylene or a crystalline copolymer of propylene and less than 30% by weight of at least one other alpha-olefin having 2-20 carbon atoms, said propylene polymer having a melting point of at least 130° C. and a MFR of 0.1-80 g/10 min.;
(C) 70-10 parts by weight of an inorganic filler; and
(D) 20-3 parts by weight of alpha-olefin copolymer which is random copolymer of at least two different alpha-olefins, said random copolymer having a MFR of 0.1-50 g/10 min., a density of 0.850-0.900 g/cm$^3$, a melting point of 40°-80°C. and a crystallinity index as measured by X-ray of less than 40%, said copolymer selected from the group consisting of ethylene/propylene copolymers, ethylene/1-butene copolymers, ethylene/1-hexene copolymers, ethylene/1-octane copolymers, ethylene/1-decene copolymers, ethylene/1-hex-adecene copolymers, propylene/1-butene copolymers,

UNITED STATES PATENT AND TRADEMARK OFFICE
CERTIFICATE OF CORRECTION

PATENT NO. : 5,025,057

DATED : June 18, 1991

INVENTOR(S) : SHIGEMORI et al

It is certified that error appears in the above-indentified patent and that said Letters Patent is hereby corrected as shown below:

propylene/1-decene copolymers, 1-butene/1-octene copolymers, 1-hexene/1-octene copolymers, ethylene/propylene/1-hexene copolymers and ethylene/1-butene/1-hexene copolymers.

Signed and Sealed this

Seventh Day of June, 1994

Attest:

BRUCE LEHMAN

Attesting Officer     Commissioner of Patents and Trademarks